Figure 1:
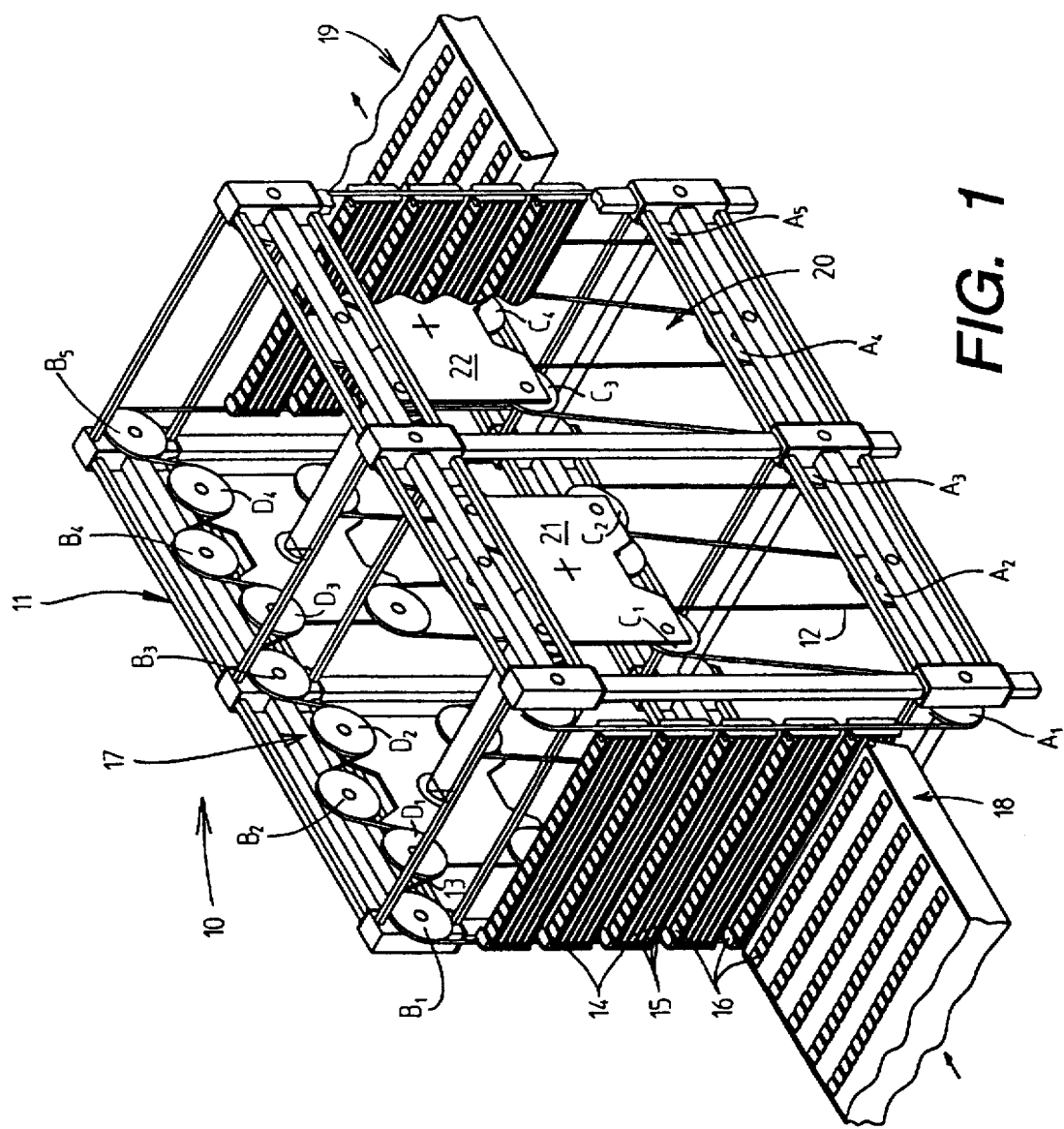

US005788057A

United States Patent [19]
Walser et al.

[11] Patent Number: 5,788,057
[45] Date of Patent: Aug. 4, 1998

[54] SUSPENDED STORAGE APPARATUS

[75] Inventors: Hans Heiri Walser, Grüsch; Urs Müller, Jenaz, both of Switzerland

[73] Assignee: Sapal Societe Anonyme des Plieuses Automatiques, Ecublens, Switzerland

[21] Appl. No.: 571,875

[22] PCT Filed: May 2, 1995

[86] PCT No.: PCT/CH95/00096

§ 371 Date: Feb. 9, 1996

§ 102(e) Date: Feb. 9, 1996

[87] PCT Pub. No.: WO95/29859

PCT Pub. Date: Nov. 9, 1995

[30] Foreign Application Priority Data

May 3, 1994 [FR] France .................... 94 05776

[51] Int. Cl.$^6$ .................................................. B65G 17/16
[52] U.S. Cl. .................... 198/797; 198/678.1; 198/680; 188/290; 211/121
[58] Field of Search .................... 198/475.1, 678.1, 198/680, 685, 797; 104/93; 105/150, 156; 188/290; 403/31; 211/121; 312/134, 268

[56] References Cited

U.S. PATENT DOCUMENTS 3,168,874  2/1965  Atanasoff .
4,168,776  9/1979  Hoeboer .................... 198/797
4,316,535  2/1982  Brems et al. .................... 105/150
4,679,666  7/1987  Brems .................... 105/150
4,908,905  3/1990  Kanno et al. .................... 188/290

FOREIGN PATENT DOCUMENTS 0538742  10/1992  European Pat. Off. .
2113573   6/1972  France .
1227831   5/1963  Germany .
2352424  10/1973  Germany .
2079235   1/1982  United Kingdom .

Primary Examiner—Joseph E. Valenza
Attorney, Agent, or Firm—Davis and Bujold

[57] ABSTRACT

An apparatus for the suspended storage of foodstuffs, particularly slabs of chocolate or the like, arranged on shelves (15) lying flat on trays (14) hanging from two parallel chains (12, 13) moving around a closed circuit that includes a supply run and a return run. Each tray (14) is combined with at least one shock absorbing device (61) for restricting the swinging motion thereof, quickly damping said motion and preventing the trays from bumping into one another. For this purpose, the shock absorbing device (61) comprises a braking disc located within a recess provided inside a housing and containing a viscous liquid.

5 Claims, 5 Drawing Sheets 5,788,057

1

SUSPENDED STORAGE APPARATUS

The present invention concerns a pendulant product storage installation, in particular for food products, and more particularly for bars of chocolate or the like, these products being placed on shelves arranged horizontally on pendulant product carriers horizontally suspended on two chains mounted on a frame and moving parallel to each other in a closed circuit comprising a feed section going from a station for loading the products on the shelves, to a product receiving station arranged for unloading the shelves, and a return section in which the shelves are brought back empty from the receiving station to the loading station, in which each pendulant product carrier is associated with at least one dampening device arranged for limiting the amplitude of its oscillating movement and for rapidly dampening this movement, this dampening device comprising at least one braking disc and means for cooperating with at least one surface of this disc for exercising friction on this surface, the disc and said means being attached respectively to one of the chains and to the pendulant product carrier and having a relative movement when the pendulant product carrier is subjected to oscillations.

Numerous pendulant storage installations are already known, in particular that disclosed in the European Patent application published under number 0 538 742 A1. In food product production lines, for example of bars of chocolate, biscuits, chocolate covered products and other products which are fragile and delicate to handle, it is often necessary to be able to have a temporary storage installation available for these products, given that production is carried out continuously while packaging is carried out in batches and the packaging units of a same line are periodically subjected to halts required for maintenance, repair or the placing of packing material.

These storage installations must comply with relatively burdensome specifications. They must allow large storage capacity and assure efficient and careful transport of the products from a loading station to a receiving station, while providing maximum security for the conveyed products, great flexibility of use and variable storage potential as a function of the instant demand.

One of the problems presented by these installations is space requirement. It is easy to understand that the user wishes to have available the greatest possible storage capacity for the minimum amount of space. This space requirement problem is in part connected to the problem of the pendulant product carriers swinging, in particular in installations in which the forward movement is carried out step by step. In the zones of rectilinear movement the pendulant product carriers are usually only subjected to vertical acceleration and deceleration which does not risk damaging the products. On the other hand, in zones of curvilinear movement, the pendulant product carriers are subjected to swinging movement and risk colliding with each other if the space separating two neighbouring columns along which these pendulant product carriers move is not greater than a determined threshold. A collision of this type risks causing a disorderly movement of the products in the pendulant product carrier, or even damaging or ejecting them. In order to avoid this risk, the columns must be sufficiently separated from each other which results in a not inconsiderable increase in the space requirement of the installation, in particular when the latter comprises a large number of columns.

U.S. Pat. No. 3,168,874 discloses a conveyor installation suspended platform mechanical oscillation dampening device. It will be noted that this device comprises mechanical friction discs, which makes it difficult to adjust and does not enable a systematic return of the platform to a vertical position to be guaranteed. For the pendulant product carriers it is necessary both that the dampening of the oscillations takes place very rapidly and that at the end of this dampening they regain their zero position, that is to say a vertical position without any residual tilting due to residual friction inducing a greater force than the force of gravity which tends to bring them back to the vertical.

The present invention proposes to resolve the aforementioned problems by overcoming the disadvantages of known prior systems and by providing a compact installation, having a minimum space requirement while overcoming the risk of collision between the pendulant product carriers.

These objects are achieved by the storage installation according to the invention, which is characterised in that the braking disc is housed within a cavity which is arranged inside a case and which contains a viscous liquid.

In an advantageous manner, said viscous liquid is an oil having a high viscosity coefficient.

Preferably, said cavity has a cylindrical shape and the height of its lateral wall is slightly greater than the thickness of the braking disc so that the space separating the flat surfaces of this disc from the adjacent inner walls of the cavity is small, but sufficient to contain a predetermined volume of viscous liquid.

This braking disc may be attached to a sleeve mounted on a pivot which constitutes the pin of a link of a chain, this sleeve being attached to said link.

Preferably, said sleeve comprises peripheral notches arranged parallel to its axis and the braking disc is driven onto said notches.

In an advantageous manner, said cavity is arranged inside a case attached no a lateral support of a pendulant product carrier, this case being principally formed of a circular part and a cover fixed against said circular part, said cover may comprise an annular rim which fits around said circular part in a watertight manner or an annular recess arranged for containing a sealing gasket in contact with said sleeve.

In an advantageous embodiment, the dampening device comprises several braking discs housed within the cavity containing a viscous liquid.

Preferably, these braking discs are divided into a first group of braking discs attached to the sleeve, and a second group of braking discs attached to the case, each disc of the second group being interposed between two discs of the first group.

In this embodiment, the braking discs of the second group are driven inside the cover onto notches which line an inner surface defining the lateral wall of the cylindrical cavity.

Figure 2:
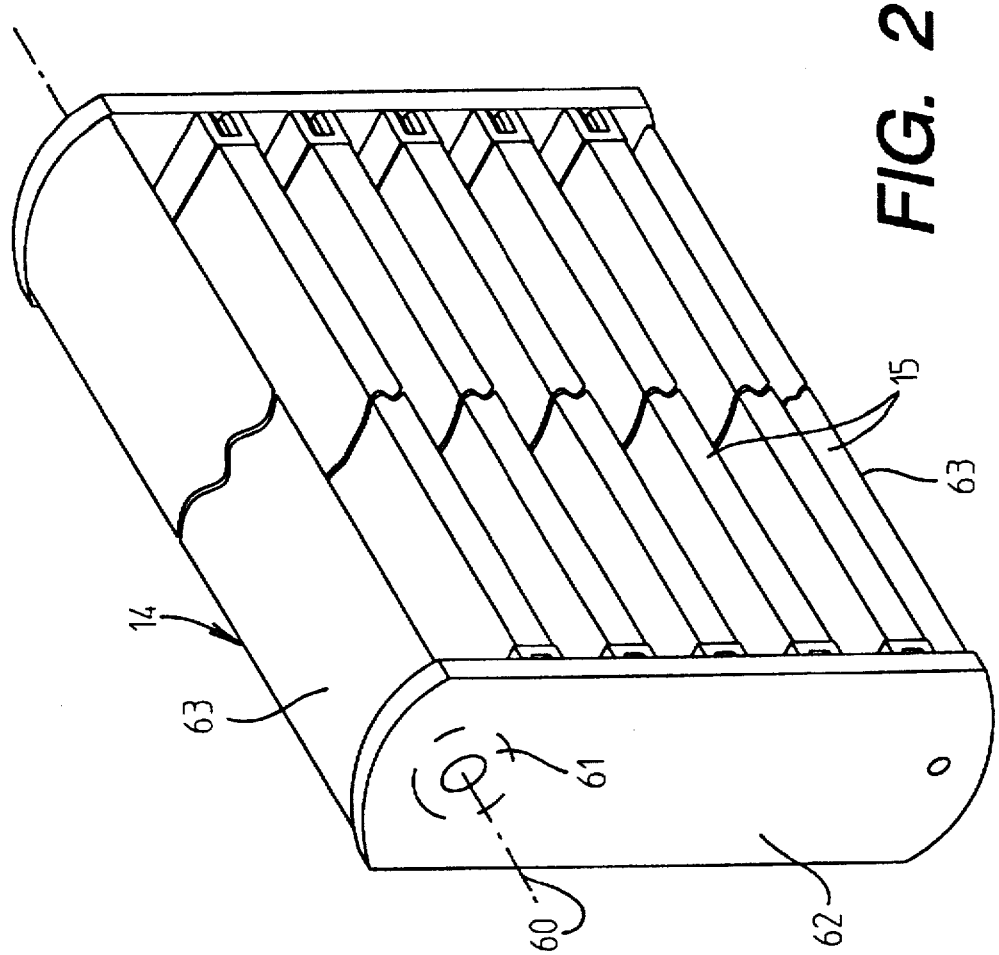
Figure 3:
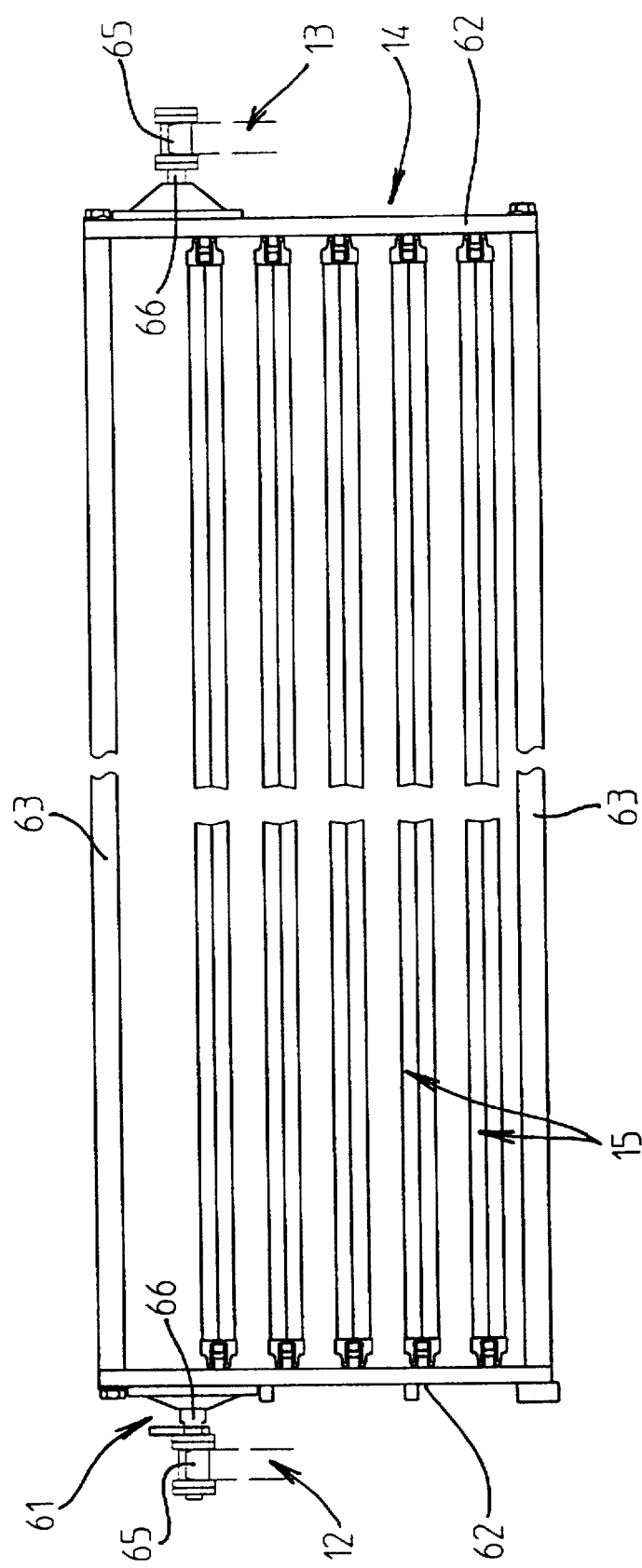
Figure 4:
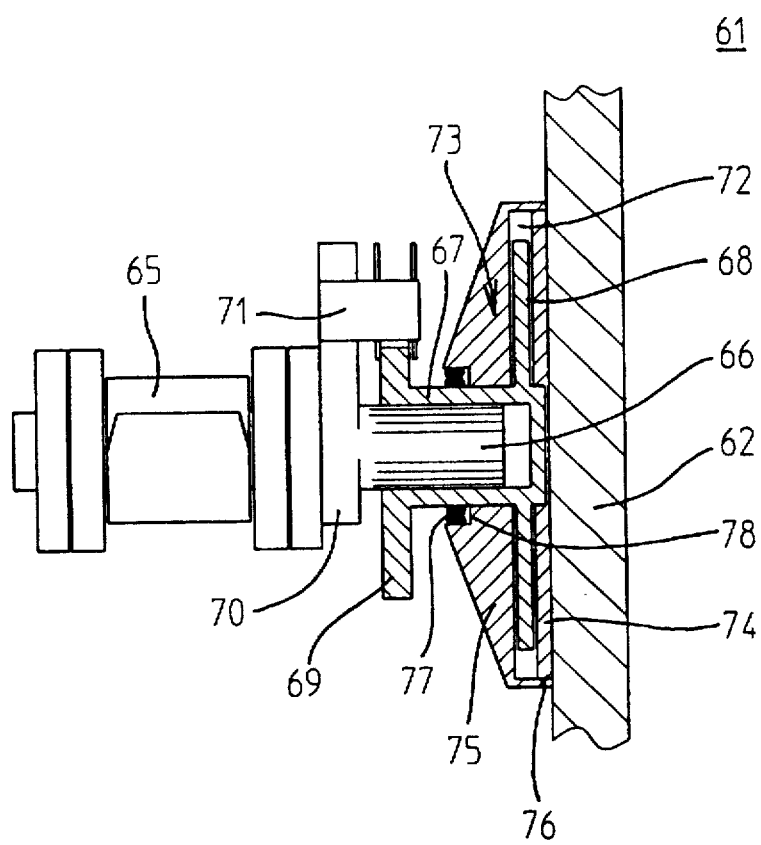
Figure 5:
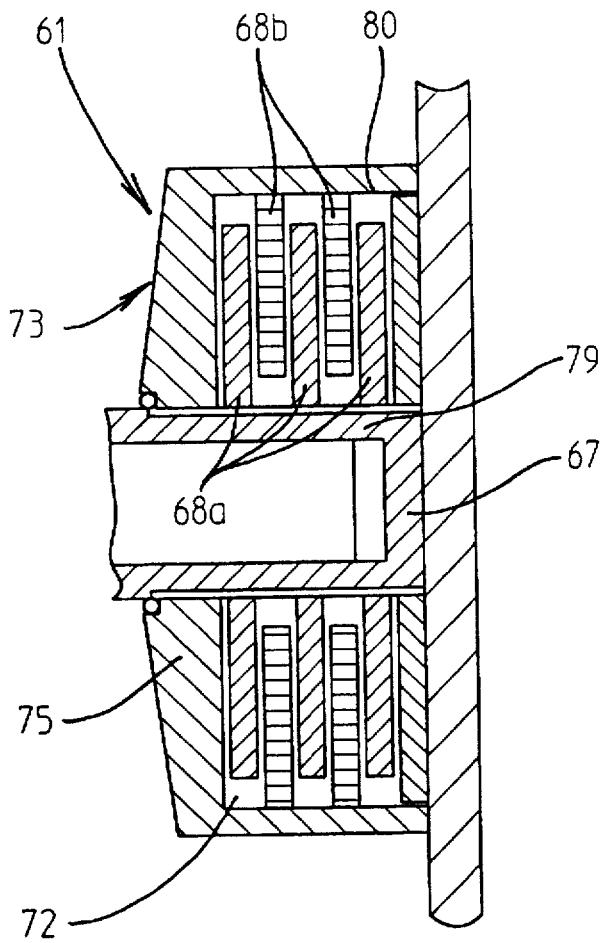

The present invention will be better understood with reference to the description of a preferred embodiment and to the attached drawing given by way of non limiting example, in which:

FIG. 1 shows a perspective view illustrating a preferred embodiment of the storage installation according to the invention, FIG. 2 shows a perspective view of a pendulant product carrier carrying shelves intended to receive products, FIG. 3 shows an axial cross-sectional view of the pendulant product carrier of FIG. 2, suspended on two chains of the installation, FIG. 4 shows a cross-sectional view of a dampening device equipping the pendulant product carrier of FIGS. 2 and 3, and FIG. 5 shows a similar view to that of FIG. 3, but illustrating an alternative embodiment of the dampening device.

Referring to FIG. 1, the pendulant storage installation 10, shown in perspective, consists principally of a frame 11 which, in this case, has the shape of a parallelepipedic rectangle which defines a storage space inside which are mounted two endless conveying chains 12 and 13 between which pendulant product carriers 14 are suspended carrying shelves 15 on which products 16 are placed. Pendulant product carriers 14 are suspended horizontally by two lateral pivots on chains 12 and 13 which move parallel to each other along a multiple loop path comprising a first section called the feed section 17 going from a station 18 for loading the products onto the shelves to a receiving station 19, arranged for unloading said shelves, and a second section 29 called the return section in which the previously unloaded shelves return from the receiving station to the loading station. In the example shown, the installation comprises five pairs of lower sprocket wheels, A1, A2, A3, A4, A5 respectively, and five pairs of upper sprocket wheels, B1, B2, B3, B4, B5 respectively, which are mounted on fixed shafts carried by the frame. Furthermore, the installation comprises, in the example shown, two vertically mobile carriages 21 and 22 respectively, which each carry two pairs of lower sprocket wheels C1, C2 (for carriage 21) and C3, C4 (for carriage 22) and two pairs of upper sprocket wheels D1, D2 (for carriage 21) and D3, D4 (for carriage 22). The feed section of the closed circuit defined by the two chains 12 and 13 consists of chain segments passing from the loading station immediately below sprocket wheels B1, then above these sprocket wheels, below upper sprocket wheels D1 of carriage 21, above sprocket wheels B2, below upper sprocket wheels D2 of carriage 21, then above sprocket wheels B3, below upper sprocket wheels D3 of carriage 22, above sprocket wheels B4, below upper sprocket wheels D4 of carriage 22, and above sprocket wheels B5 in order to descend again vertically to the receiving station. The return section is defined by the sections of chain going from the return station below sprocket wheels A5, then above lower sprocket wheels C4 of carriage 22, below sprocket wheels A4, above lower sprocket wheels C3 of carriage 22, below sprocket wheels A3, above lower sprocket wheels C2 of carriage 21, below sprocket wheels A2, above lower sprocket wheels C1 of carriage 21, and finally below sprocket wheels A1 to return straight down to the loading station. As a result of the mobile carriages, the storage installation has a variable accumulation or storage capacity, when the carriages are in a high position, the feed section is minimal, that is to say that the products are conveyed as quickly as possible from the loading station to the receiving station. On the other hand, when the carriages descend to a low position, the length of the feed section increases as does the installation storage capacity.

Products 16 are arranged on shelves 15 which are superposed in a parallel manner in pendulant product carriers 14.

FIG. 2 shows a perspective view and FIG. 3 an axial cross-sectional view illustrating pendulant product carrier 14 carrying a set of shelves 15 intended to transport said products 16 from loading station 18 to receiving station 19. In known installations, pendulant product carriers having similar functions are suspended on lateral chains and may pivot freely around a shaft 60. As has been mentioned previously, the longitudinal space requirement of the installation is, to a certain extent, a function of the free space which must necessarily be maintained between the columns of the pendulant product carriers to prevent the latter colliding with each other in the areas where they are subjected to swinging movements, in particular in the curvilinear zones of the circuit. As it is not possible to prevent the pendulant product carriers from swinging, especially in an installation where the advance movement is carried out step by step, it is necessary to find means enabling the amplitude of the swing and consequently, the risk of the pendulant product carriers colliding, to be limited.

In the embodiment described, each pendulant product carrier is equipped with at least one dampening device 61 which will be described in more detail with reference to the axial cross-sectional view of FIG. 4.

Each pendulant product carrier consists of a frame formed of two lateral supports 62 connected by two side members 63 mounted parallel to the respective ends of supports 62. These supports 62 comprise means enabling the detachable fixing of shelves 15 to be assured, said shelves being preferably mounted in a detachable manner on the pendulant product carriers and arranged parallel to each other.

As is shown more particularly in FIG. 3, pendulant product carrier 14 is suspended by its lateral supports 62 on links 65 of two chains 12 and 13. Supports 62, and consequently pendulant product carrier 14, are suspended on two horizontal pivots 66 which in fact constitute a prolongation of the pin of links 65. Dampening device 61 is mounted on one side of pendulant product carrier 14. However, a device of this type could be fitted to both sides to obtain a more significant dampening effect on the swinging movement of the pendulant product carrier.

This dampening device 61 is shown in more detail in FIG. 4. Pivot 66 which constitutes the pin of link 65 of one of chains 12 or 13, carries a sleeve 67 on which a braking disc 68 is mounted. This sleeve is freely mounted on pivot 66 and advantageously carries as its periphery a set of axial notches. The braking disc is driven onto these notches which assures that it is held in position. Sleeve 67 is attached to a plate 69 which is rigidly coupled to a part 70 connected to link 65 by means of a pin 71. Consequently, braking disc 68 is mechanically connected to link 65 of one of the chains. This disc is housed within a cavity 72, which is substantially cylindrical, arranged in a case 73 formed of a circular part 74 fixed to lateral support 62 of pendulant product carrier 14, and a cover 75 whose annular rim 76 fits around circular part 74 in a watertight manner. A sealing gasket 77 is placed in an annular recess 78 arranged in an area of cover 75 in contact with sleeve 67. Cavity 72 is filled with a viscous substance, for example an oil with a high viscosity coefficient, and has the shape of a cylinder the height of whose lateral wall is slightly greater than the thickness of disc 68 so that the walls of the braking disc are parallel and arranged in immediate proximity to the walls which define the cavity. Braking disc 68 is fixed since it is connected to the chain. The walls of cavity 72 are mobile since case 73 is connected to the pendulant product carrier. Between the walls of the disc and the inner walls of the cavity, there is a small layer of oil or of a highly viscous liquid. When the pendulant product carrier swings, the walls of the braking disc and those of the cavity have a relative movement which is very rapidly dampened by the friction action exercised by the viscous liquid forming a thin layer between these walls.

This dampening device has several advantages. By adjusting the separation between the braking disc and the walls defining the cavity, and by selecting an oil of determined viscosity, it is possible to obtain a significant dampening coefficient of the swinging movements of the pendulant product carriers. Furthermore, this system has no residual position, that is to say that the pendulant product carriers always regain a vertical position after an oscillating movement.

An improvement of this system is shown in FIG. 5, it concerns an alternative construction which is derived from the embodiment shown in FIG. 4, braking disc 68 being replaced by a first group of braking discs 68a and by a second group of braking discs 68b. In the example shown, the first group consists of three discs and the second group consists of two discs. Discs 68b of the second group are interposed between discs 68a of the first group. According to a preferred assembly mode of these discs, sleeve 67 comprises peripheral longitudinal notches 79 onto which braking discs 68a are driven and the cylindrical surface of cover 75, which defines the lateral wall of cylindrical cavity 72, also comprises longitudinal notches 80 onto which braking discs 68b are driven. It is obvious that these discs must be mounted one after the other, and alternately, that is to say first a disc 68a then a disc 68b and so on.

As previously, the cavity is filled with a viscous liquid and the space separating the discs is selected so that the friction between them and the film of viscous liquid is sufficiently efficient to dampen rapidly the swinging of the pendulant product carriers.

Furthermore, it is obvious that the method of fixing the case and that of the braking disc could be reversed. The braking disc could be attached to the pendulant product carrier and the case could be mounted on the chain link.

As a result of this dampening system, the oscillation amplitude of the pendulant product carriers is reduced and rapidly dampened, which enables a smaller separation between the pendulant product carrier columns to be provided and, consequently, the space requirement of the storage installation to be reduced.

We claim:

1. A pendulant storage device, in particular for food products and more particularly for bars of chocolate or the like, said products being placed on shelves arranged horizontally on pendulant product carriers horizontally suspended on two chains which move parallel to each other in a closed circuit comprising a feed section which moves from a station for loading products on said shelves, to a product receiving station, arranged for unloading said shelves, and a return section in which empty shelves are brought back from said receiving station to said loading station, in which each pendulant product carrier (14) is associated with at least one dampening device (61) arranged for limiting an amplitude of oscillating movement of said each product carrier (14) and for rapidly dampening said movement, said dampening device (61) comprising at least one braking disc (68) and means for cooperating with at least one surface of said braking disc for exercising friction on said at least one surface, said braking disc and said means being attached to one of said two chains (12, 13) and to said pendulant product carrier (14) respectively and having a relative movement when said pendulant product carrier is subjected to oscillations, in which said braking disc (68) is housed within a cavity (72) of a cylindrical shape which is arranged inside a case (73) and which contains a viscous liquid having a high viscosity coefficient, a height of a lateral wall of said cavity being slightly greater than a thickness of said braking disc (68) such that a space separating flat surfaces of said braking disc (68) from adjacent inner walls of said cavity (72) is relatively small and sufficient to contain a predetermined volume of viscous liquid, wherein said braking disc (68) is attached to a sleeve (67) mounted on a pivot (66) which constitutes a pin of a link (65) of said chains (12, 13), and said sleeve is attached to said link.

2. The storage device according to claim 1, wherein said sleeve (67) comprises peripheral notches arranged parallel to an axis of said sleeve (67), and said braking disc (68) is driven into said notches.

3. The storage device according to claim 1, wherein said cavity (72) is arranged inside a case (73) attached to a lateral support (62) of a pendulant product carrier (14), said case principally consisting of a circular part (74) and a cover (75) fixed against said circular part.

4. The storage device according to claim 3, wherein said cover (75) comprises an annular rim (76) which fits around said circular part (74) in a watertight manner.

5. The storage device according to claim 3, wherein said cover comprises an annular recess (78) arranged for containing a sealing gasket in contact with said sleeve (67).

* * * * *